United States Patent
Holz et al.

(10) Patent No.: US 7,015,944 B2
(45) Date of Patent: Mar. 21, 2006

(54) DEVICE FOR IMPROVING VISIBILITY IN VEHICLES

(75) Inventors: Michael Holz, Senden (DE); Edgar Weidel, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 573 days.

(21) Appl. No.: 10/185,022

(22) Filed: Jun. 28, 2002

(65) Prior Publication Data

US 2003/0001955 A1 Jan. 2, 2003

(30) Foreign Application Priority Data

Jun. 30, 2001 (DE) ............................ 101 31 840

(51) Int. Cl.
*H04N 7/18* (2006.01)

(52) U.S. Cl. ................... 348/148; 348/61; 348/139; 348/149; 348/162; 348/164

(58) Field of Classification Search ............ 348/61, 348/139, 148–149, 162, 164; 362/459–460, 362/467, 487, 545, 553; 356/5.04
See application file for complete search history.

(56) References Cited

U.S. PATENT DOCUMENTS

| | | | |
|---|---|---|---|
| 4,632,543 A * | 12/1986 | Endo | 356/5.08 |
| 4,970,628 A * | 11/1990 | Bergkvist | 362/510 |
| 5,255,163 A * | 10/1993 | Neumann | 362/510 |
| 5,477,461 A | 12/1995 | Waffler et al. | 364/461 |
| 6,335,789 B1 * | 1/2002 | Kikuchi | 356/141.1 |
| 6,552,342 B1 * | 4/2003 | Holz et al. | 250/330 |
| 6,759,949 B1 * | 7/2004 | Miyahara | 340/345 |
| 6,863,412 B1 * | 3/2005 | Weidel | 362/26 |
| 2002/0191388 A1 * | 12/2002 | Matveev | 362/31 |
| 2002/0196639 A1 * | 12/2002 | Weidel | 362/521 |

FOREIGN PATENT DOCUMENTS

| | | |
|---|---|---|
| DE | 4007646 | 9/1991 |
| DE | 4032927 | 4/1992 |
| DE | 19756706 | 6/1999 |
| EP | 0997746 | 5/2000 |
| GB | 2271139 | 4/1994 |

* cited by examiner

*Primary Examiner*—Vu Le
(74) *Attorney, Agent, or Firm*—Davidson, Davidson & Kappel, LLC

(57) ABSTRACT

The present invention relates to a device for improving visibility in a vehicle, especially in darkness, bad weather and fog, including one or more laser headlights radiating laser light of a wavelength outside the visible spectrum into a predetermined solid angle area ahead of the vehicle, a camera which is sensitive outside the visible spectrum and used for taking images of current traffic scenes, as well as an optical display system in the vehicle for reproducing the captured images in the visible spectrum. According to the present invention, provision is made for at least two different types of laser headlights which each illuminate different parts of the solid angle area to be observed to produce an angle-dependent radiation pattern of the laser light in a simple manner.

17 Claims, 1 Drawing Sheet

DEVICE FOR IMPROVING VISIBILITY IN VEHICLES

Priority to German Patent Application No. 101 31840.5-51, filed Jun. 30, 2001 and incorporated by reference herein, is claimed.

BACKGROUND INFORMATION

The present invention relates to a device for improving visibility in a vehicle.

Bad visibility at night is a tiring and dangerous situation which is feared by many drivers. As a consequence of bad visibility, the accident frequency is markedly higher at night than while traveling during the day and in good visibility. At night, in particular, the following difficulties occur:

With low beams in case of oncoming traffic, the range of vision is low and misjudged by many drivers. This results in late detection of unlighted obstacles, pedestrians, bicyclists without light and of animals and consequently results in accidents.

The driver is dazzled by the headlights of oncoming vehicles and their reflexes, in particular, when the roadway is wet; the driver drives into a black hole for a short period of time. This is a danger especially to night-blind and aged drivers because of their low visual performance.

In rain, fog and blowing snow, the visibility conditions can even be markedly worse.

An improvement of visibility at night is achieved by an opto-electronic system which is set forth in German Patent Application DE 40 07 646 A1. The system takes a video image of a traffic scene and displays it to the driver in a suitable manner. The displayed image contains additional information which cannot, or only with difficulty, be detected by the driver with his/her own eyes, especially in darkness, bad weather and fog.

In addition to the normal headlights, the system includes an infrared headlight which uses, as the light source, laser diodes emitting in the near infrared. The laser diodes are operated in a pulsed manner. A CCD camera for taking the video image is accommodated in the roof area of the vehicle. The CCD camera has an electronic shutter which is synchronized with the laser diodes. An optical bandpass filter is attached in front of the camera lens. The video image is shown to the driver on an LCD display. The lasers emit at a wavelength of 810 nm in the near infrared. Since the infrared light is nearly invisible to the human eye and because the luminous intensity used is not higher than with a conventional vehicle headlight, permanent high beam lighting is possible.

The mentioned publication proposes, moreover, to vary the brightness of the lighting as a function of the transmission angle, for example, to illuminate the foreground of a traffic scene less brightly than the background. In this manner, it is possible to compensate for the luminance of the laser light which decreases with distance and to achieve a more uniform illumination of the scene. In particular, a laser beam is swung back and forth in one spatial direction by a tilting mirror and, in a spatial direction perpendicular thereto, is either uniformly expanded or swung rapidly as well to successively scan the traffic scene to be illuminated, and the intensity of the laser light is varied synchronously with the motion of the tilting mirror. However, high demands are placed on the mechanism required for tilting the mirror, which are difficult to meet in the case of a vehicle.

SUMMARY OF THE INVENTION

An object of the present invention is to produce an angle-dependent radiation pattern of the laser light in a simple manner.

The present invention provides a device for improving visibility in a vehicle, especially in darkness, bad weather and fog, including one or more laser headlights radiating laser light of a wavelength outside the visible spectrum into a predetermined solid angle area ahead of the vehicle, a camera which is sensitive outside the visible spectrum and used for taking images of current traffic scenes, as well as an optical display system in the vehicle for reproducing the captured images in the visible spectrum. At least two different types of laser headlights are provided which each illuminate different parts of the solid angle area to be observed.

Because the laser light is emitted by two or more different types of laser headlights which each illuminate different parts of the solid angle area to be observed, it is possible for the type of the laser light source, the optical power, the optics and, possibly, the wavelength of the respective laser headlights to be optimally adapted the specific purpose of illumination, for example, for a "road headlight" and a "person or pedestrian headlight". By suitable selection of the parts of the solid angle area to be observed which are illuminated by the different types of laser headlights and of the overlapping regions thereof, it is possible for the overall radiation pattern to be optimized in a simple manner.

In a preferred embodiment, the laser light is generated at a location remote from the front of the vehicle and directed through a light guide to the vehicle front where it is emitted by suitable optics. This has the advantage that the sensitive laser light source can be installed in any protected location, for example, inside the electronics for the night vision system. Only the more robust light exit optics has to be located at the front of the vehicle.

Moreover, the use of light guides has the advantage that they can easily be provided with branches, either to supply several light exit optics with laser light from a common source or to direct the light of several laser light sources, which can also have different wavelengths, to a common light exit optics system.

A motor vehicle contains two or more infrared laser headlights radiating in the direction of travel. Each laser headlight contains one or more infrared lasers, in particular, laser diodes, working in the near infrared. Alternatively, the system can also work in another spectral range outside the visible spectrum, for example, in the far infrared or with ultraviolet light.

If each laser headlight contains only one laser, there are different ways to illuminate the solid angle area to be observed ahead of the vehicle.

a) Simultaneous illumination of the entire area by two-dimensional expansion of the laser beam b) Expansion in one direction only while, at the same time, narrowly concentrating the beam in the orthogonal second direction and swinging (scanning) the illuminated flat solid angle segment in the second direction.

c) Swinging the whole laser beam in two dimensions for illuminating the entire solid angle area in a scanning manner.

Alternatively, an array of laser diodes which together illuminate the entire solid angle area can be used as a laser headlight.

In the exemplary embodiment, two different types of laser headlights are used which each illuminate different parts of the solid angle area to be observed. A first type of laser headlight, either a single headlight or also several, for example, two laser headlights, which are attached near the conventional headlights, respectively, essentially illuminate(s) the road lying ahead of the vehicle in a similar manner as with conventional high beams, that is, a relatively narrow segment of the solid angle area to be observed. A second type of laser headlight, also either a single headlight or also several, for example, two laser headlights, which are attached near the conventional headlights, respectively, illuminate(s) the currently observed solid angle area with concentrations in a near region ahead of the vehicle, that is, obliquely downward from the vehicle, and obliquely to the side, if required in an asymmetrical manner. In this respect, the second type of laser headlight has a radiation pattern which is similar to conventional dimmed headlight but which, because of the absence of the dazzling or blinding effect, can be angled upward at a greater angle to reliably detect any persons located at the edge of the road.

The use of two different types of laser headlights has the advantage that the lasers and the optics of the individual laser headlights can be optimized for the respective purpose of use. A "road headlight", for instance, makes do with a single laser diode without any optics for beam expansion if the natural divergence of the laser diode has just the appropriate value for "high beam". On the other hand, there is no need to place high demands on the coherence of the laser and its beam expansion optics for a "person headlight". Moreover, the optical power and possibly also the wavelength of the two types of laser headlights can be optimally adapted to the respective purpose of use. When two laser headlights of that kind are arranged at a distance from each other and radiate light of different wavelengths, which can be distinguished from each other by the camera described further below, stereo vision is possible with a single camera.

The laser light can but does not have to be generated immediately at the front of the vehicle as with conventional headlights. In an exemplary embodiment, one or more laser light sources are accommodated in the vehicle electronics or in another protected location from where the laser light is directed through light guides to one or more light exit optics which constitute the laser headlight(s). It is also possible for the light guides to branch so that, for example, several laser headlights can be supplied by one laser. Or, the light of several lasers, which can also have different wavelengths for the illumination optimization described above, can be fed to one or more laser light headlights via merging or optically coupled light guides.

The motor vehicle further contains, as an image sensor, a camera which is arranged such that it captures the traffic scene which presents itself in the direction of travel. The camera is sensitive at least to the light of the laser headlight(s) which is reflected from the environment, in this exemplary embodiment in the near infrared. The video image taken by the camera is displayed to the driver on an optical display system in the vehicle, the optical display system being, for example, a display at the top of the dashboard or a projector for reflecting the image in a region of the windshield in the manner of a head-up display.

The camera is attached immediately behind the windshield near the rearview mirror, as described in British Patent Application 2271139 A1. As described therein, the windshield includes an insert made of IR-transmitting material at this location. In the here described exemplary embodiment, a windshield made of homogenous material is used which is covered with an infrared-reflecting film to reduce heat radiation. This film is left open in the region of the field of view of the camera to let infrared light through for the camera, while accepting the low IR absorption in the glass itself.

The vertical distance between the conventional headlight(s) and the laser headlights on one hand and the camera on the other hand should be as large as possible to allow the camera to look through the veil of light, the atmospheric stray light, of the headlights. In this regard, placement at the level of the rearview mirror, where today, for example, a rain sensor is mounted as well, is advantageous but can possibly be further improved, depending on the vehicle design, in that the camera is always mounted as high as possible.

In the case of the above-described placement of the camera behind the windshield, moreover, care will be taken that the windshield region located in the field of view of the camera is in the operating range of at least one windshield wiper in order that the cameral has clear vision also when it is raining. In the exemplary embodiment, the camera and the windshield wiper are operated together synchronously, for example, in that each time the windshield wiper is in the field of view of the camera, the optical display system in the vehicle does not display the current image but the image which has been transmitted last. The suppressed time interval is too short to be noticed by the driver.

If for some reason it is not possible or desired to place the camera at the very top of the vehicle, the camera can be inconspicuously accommodated in one of the outside mirrors without obstruction by the windshield. If a further camera is accommodated in the second outside mirror, stereo vision and, consequently, distance measurement of objects become possible without the need for a separate range finder.

In another exemplary embodiment, the camera is sensitive not only in the wavelength range of the laser headlight(s) but also in the visible spectrum, as is the case, for example, with a CCD sensor, if the otherwise usual filter for visible light is omitted or made deactivatable. Because of this, in addition to its use in bad visibility, the camera can also be used as a daylight camera, for example, to take images of the current traffic scene which are used to perform an automatic detection of roadway edges, traffic signs or other safety-related details. The detected details are evaluated as to whether a dangerous situation of any kind is present, for example, due to roadway departure or overspeeding, which will then be indicated to the driver by audible or visual warning signals.

If the camera sensitivity required for IR night vision is too high for use as a daylight camera, it is provided with an automatically adjustable iris diaphragm which, during the day, is closed to such an extent that the camera is not overexposed. However, there are also cameras whose sensitivity to light can be set to the required value with the aid of its electronics so that it makes do without any mechanisms.

In a further exemplary embodiment, the laser headlight(s) and the camera are used not only for the above described system for improving visibility in darkness, bad weather and fog but at the same time are used by a system for communicating with other vehicles, for example, to continuously send status information for warning the drivers of preceding or oncoming vehicles of any dangerous situations or to automatically cause oncoming vehicles with high beam on to switch to low beam.

For this purpose, the laser light which is actually only radiated for improving visibility is modulated with the information to be transmitted; and, in a vehicle which is also provided with the described camera and/or any other IR sensor and which gets into the range of the laser light, the information can be recovered from the laser light and evaluated.

DETAILED DESCRIPTION

Figure 1:
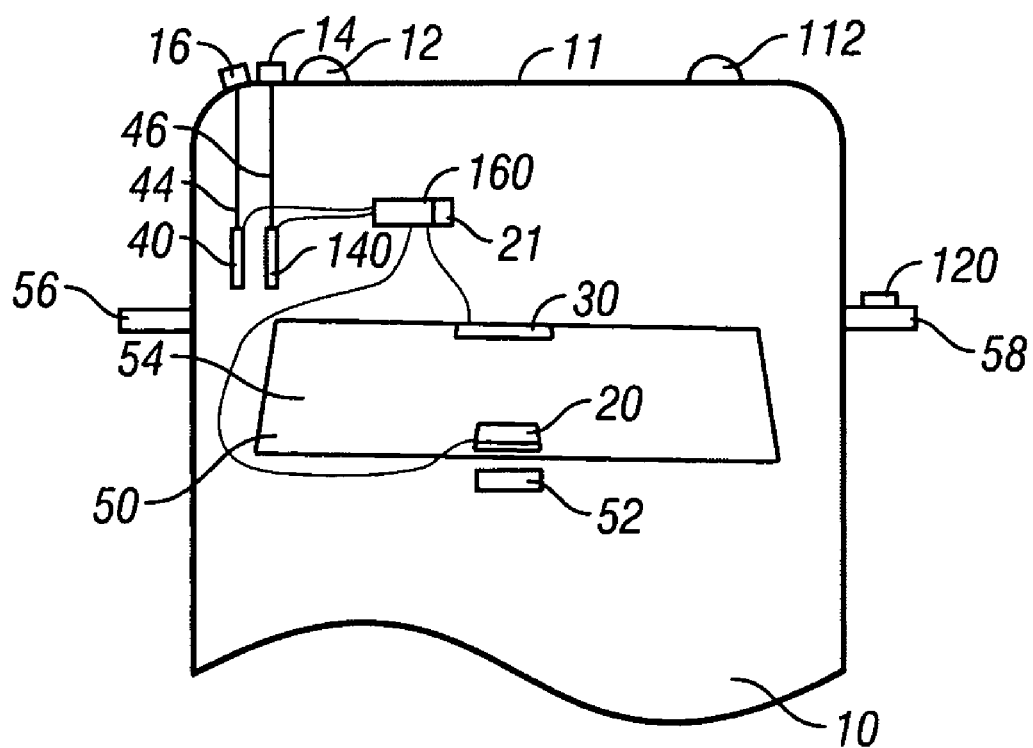
FIG. 1 shows schematically one embodiment of the present invention.

FIG. 1 shows a vehicle 10 having conventional headlights 12, 112 and laser headlights 14, 16 radiating laser light of a wavelength outside the visible spectrum into a predetermined solid angle area ahead of the vehicle. A camera 20 is sensitive outside the visible spectrum and is used for taking images of current traffic scenes. An optical display system 30 in the vehicle reproduces the captured images in the visible spectrum. Laser headlights 14, 16 each illuminate different parts of the solid angle area to be observed.

Lasers 40, 140 generating the laser light are arranged in a location remote from a front 11 of the vehicle 10 and are connected to the laser headlights 14, 16 via light guides 44, 46.

The camera 20 is attached behind the windshield 50 of the vehicle 10 at the level of the inside rearview mirror 52.

An infrared-reflecting film 54 on the windshield 50 of the vehicle is left open in the region of the field of view of the camera 20.

Camera 20 preferably is mounted as high as possible on the vehicle. Alternately, the camera 20 may be accommodated in one of the outside mirrors 56, 58 of the vehicle. A further camera 120 which is sensitive outside the visible spectrum may be accommodated in the other outside mirror for taking the images of current traffic scenes at a different angle. Camera 20 may also be sensitive within the visible spectrum. A device 21 for automatically adapting the camera's sensitivity to light to the ambient luminosity may be provided, for example as part of a processor 160

Processor 160 can also be provided so that the lasers 14, 16 can be used as data transmitters to send signals to other vehicles having a camera for receiving such signals. Processor 160 can also receive an input from camera 20 and process traffic or communication signals therefrom.

What is claimed is:

1. A device for improving visibility in a vehicle having one or more laser headlights radiating laser light outside the visible spectrum into a predetermined solid area angle ahead of the vehicle, comprising:
    a first laser headlight radiating first laser light into a first part of the predetermined solid angle area ahead of the vehicle, the first laser light having a wavelength outside the visible spectrum,
    a second laser headlight radiating second laser light into another part of the predetermined solid angle area ahead of the vehicle, the second laser light having a wavelength outside the visible spectrum,
    a camera sensitive to light outside the visible spectrum for taking images of current traffic scenes;
    an optical display system in the vehicle for reproducing the captured images in the visible spectrum; and
    lasers for generating the first and second laser lights, the lasers being arranged in a location remote from a front of the vehicle and connected to the first and second laser headlights via light guides.

2. The device as recited in claim 1 wherein the camera is mounted at the top of the vehicle.

3. The device as recited in claim 1 wherein the camera also is sensitive to light within the visible spectrum.

4. The device as recited in claim 1 wherein the camera is accommodated in one of the outside mirrors of the vehicle.

5. A device for improving visibility in a vehicle having one or more laser headlights radiating laser light outside the visible spectrum into a predetermined solid area angle ahead of the vehicle, comprising:
    a first laser headlight radiating first laser light into a first part of the predetermined solid angle area ahead of the vehicle, the first laser light having a wavelength outside the visible spectrum,
    a second laser headlight radiating second laser light into another part of the predetermined solid angle area ahead of the vehicle, the second laser light having a wavelength outside the visible spectrum,
    a camera sensitive to light outside the visible spectrum for taking images of current traffic scenes; and
    an optical display system in the vehicle for reproducing the captured images in the visible spectrum,
    wherein the camera is attached behind the windshield of the vehicle at a level of an inside rearview mirror; and
    wherein an infrared-reflecting film on the windshield of the vehicle is left open in the region of the field of view of the camera.

6. The device as recited in claim 5 wherein the camera is mounted at the top of the vehicle.

7. The device as recited in claim 5 wherein the camera is accommodated in one of the outside mirrors of the vehicle.

8. A device for improving visibility in a vehicle having one or more laser headlights radiating laser light outside the visible spectrum into a predetermined solid area angle ahead of the vehicle, comprising:
    a first laser headlight radiating first laser light into a first part of the predetermined solid angle area ahead of the vehicle, the first laser light having a wavelength outside the visible spectrum,
    a second laser headlight radiating second laser light into another part of the predetermined solid angle area ahead of the vehicle, the second laser light having a wavelength outside the visible spectrum,
    a camera sensitive to light outside the visible spectrum for taking images of current traffic scenes; and
    an optical display system in the vehicle for reproducing the captured images in the visible spectrum.
    wherein the camera is accommodated in one of the outside mirrors of the vehicle.

9. A device for improving visibility in a vehicle having one or more laser headlights radiating laser light outside the visible spectrum into a predetermined solid area angle ahead of the vehicle, comprising:
    a first laser headlight radiating first laser light into a first part of the predetermined solid angle area ahead of the vehicle, the first laser light having a wavelength outside the visible spectrum,
    a second laser headlight radiating second laser light into another part of the predetermined solid angle area ahead of the vehicle, the second laser light having a wavelength outside the visible spectrum,
    a camera sensitive to light outside the visible spectrum accommodated in one of the outside mirrors of the vehicle for taking images of current traffic scenes;
    an optical display system in the vehicle for reproducing the captured images in the visible spectrum; and a further camera sensitive to light outside the visible spectrum is accommodated in the other outside mirror for taking the images of current traffic scenes at a different angle.

10. The device as recited in claim 9 wherein the camera is mounted at the top of the vehicle.

11. The device as recited in claim 9 wherein the camera is accommodated in one of the outside mirrors of the vehicle.

12. A device for improving visibility in a vehicle having one or more laser headlights radiating laser light outside the visible spectrum into a predetermined solid area angle ahead of the vehicle, comprising:
   a first laser headlight radiating first laser light into a first part of the predetermined solid angle area ahead of the vehicle, the first laser light having a wavelength outside the visible spectrum,
   a second laser headlight radiating second laser light into another part of the predetermined solid angle area ahead of the vehicle, the second laser light having a wavelength outside the visible spectrum,
   a camera sensitive to light outside the visible spectrum for taking images of current traffic scenes; and
   an optical display system in the vehicle for reproducing the captured images in the visible spectrum;
   wherein the camera also is sensitive to light within the visible spectrum; and
   a device for automatically adapting the camera's sensitivity to light to the ambient luminosity.

13. The device as recited in claim 12 wherein the camera is mounted at the top of the vehicle.

14. The device as recited in claim 12 wherein the camera is accommodated in one of the outside mirrors of the vehicle.

15. A device for improving visibility in a vehicle having one or more laser headlights radiating laser light outside the visible spectrum into a predetermined solid area angle ahead of the vehicle, comprising:
   a first laser headlight radiating first laser light into a first part of the predetermined solid angle area ahead of the vehicle, the first laser light having a wavelength outside the visible spectrum,
   a second laser headlight radiating second laser light into another part of the predetermined solid angle area ahead of the vehicle, the second laser light having a wavelength outside the visible spectrum,
   a camera sensitive to light outside the visible spectrum for taking images of current traffic scenes; and
   an optical display system in the vehicle for reproducing the captured images in the visible spectrum,
   wherein at least one of the laser headlight and the camera are part of a system for optical communication with another vehicle.

16. The device as recited in claim 15 wherein the camera is mounted at the top of the vehicle.

17. The device as recited in claim 15 wherein the camera is accommodated in one of the outside mirrors of the vehicle.

* * * * *